US007680886B1

(12) United States Patent
Cooley

(10) Patent No.: US 7,680,886 B1
(45) Date of Patent: Mar. 16, 2010

(54) SUPPRESSING SPAM USING A MACHINE LEARNING BASED SPAM FILTER

(75) Inventor: Shaun P. Cooley, Huntington Beach, CA (US)

(73) Assignee: Symantec Corporation, Mountain View, CA (US)

( * ) Notice: Subject to any disclaimer, the term of this patent is extended or adjusted under 35 U.S.C. 154(b) by 1117 days.

(21) Appl. No.: 10/411,581

(22) Filed: Apr. 9, 2003

(51) Int. Cl.
*G06F 15/16* (2006.01)

(52) U.S. Cl. ...................................... 709/206; 709/223

(58) Field of Classification Search ........................ None
See application file for complete search history.

(56) References Cited

U.S. PATENT DOCUMENTS

| | | | |
|---|---|---|---|
| 5,675,710 A | 10/1997 | Lewis | |
| 5,826,249 A | 10/1998 | Skeirik | |
| 6,023,723 A * | 2/2000 | McCormick et al. | 709/206 |
| 6,052,709 A | 4/2000 | Paul | |
| 6,072,942 A | 6/2000 | Stockwell et al. | |
| 6,161,130 A * | 12/2000 | Horvitz et al. | 709/206 |
| 6,167,434 A | 12/2000 | Pang | |
| 6,249,807 B1 | 6/2001 | Shaw et al. | |
| 6,253,169 B1 | 6/2001 | Apte et al. | |
| 6,282,565 B1 | 8/2001 | Shaw et al. | |
| 6,289,416 B1 | 9/2001 | Fukushima et al. | |
| 6,298,351 B1 | 10/2001 | Castelli et al. | |
| 6,324,569 B1 | 11/2001 | Ogilvie et al. | |
| 6,330,590 B1 * | 12/2001 | Cotten | 709/206 |
| 6,347,310 B1 | 2/2002 | Passera | |
| 6,370,526 B1 | 4/2002 | Agrawal et al. | |
| 6,397,200 B1 | 5/2002 | Lynch, Jr. et al. | |
| 6,397,215 B1 | 5/2002 | Kreulen et al. | |
| 6,421,709 B1 | 7/2002 | McCormick et al. | |
| 6,424,960 B1 | 7/2002 | Lee et al. | |
| 6,442,606 B1 | 8/2002 | Subbaroyan et al. | |
| 6,456,991 B1 | 9/2002 | Srinivasa et al. | |
| 6,487,586 B2 | 11/2002 | Ogilvie et al. | |
| 6,493,007 B1 | 12/2002 | Pang | |
| 6,502,082 B1 | 12/2002 | Toyama et al. | |
| 6,505,167 B1 | 1/2003 | Horvitz et al. | |
| 6,546,416 B1 | 4/2003 | Kirsch | |
| 6,615,241 B1 * | 9/2003 | Miller et al. | 709/206 |
| 6,615,242 B1 * | 9/2003 | Riemers | 709/206 |
| 6,640,301 B1 | 10/2003 | Ng | |
| 6,643,685 B1 | 11/2003 | Millard | |
| 6,650,890 B1 | 11/2003 | Irlam et al. | |
| 6,654,787 B1 * | 11/2003 | Aronson et al. | 709/206 |
| 6,687,740 B1 | 2/2004 | Gough | |

(Continued)

OTHER PUBLICATIONS

Sebastiani, Fabrizio. "Machine Learning in Automatic Text Categorization." ACM Computing Surveys. vol. 34, Issue 1. Mar. 2002. pp. 1-47. ACM Press.*

(Continued)

*Primary Examiner*—Vivek Srivastava
*Assistant Examiner*—Jeffrey R Swearingen
(74) *Attorney, Agent, or Firm*—Fenwick & West LLP

(57) ABSTRACT

Computer implemented methods, apparati, and computer readable media for suppressing spam entering a computing device. A method embodiment comprises the steps of routing an electronic message leaving the computing device to a machine learning based spam filter defining the message to be clean; and training the filter, with the message being an input to the filter.

35 Claims, 4 Drawing Sheets

U.S. PATENT DOCUMENTS

| | | | |
|---|---|---|---|
| 6,691,156 B1 | 2/2004 | Drummond et al. | |
| 6,697,942 B1 | 2/2004 | L'Heureux et al. | |
| 6,701,347 B1 | 3/2004 | Ogilvie | |
| 6,711,608 B1 | 3/2004 | Ogilvie | |
| 6,732,149 B1* | 5/2004 | Kephart | 709/206 |
| 6,732,157 B1 | 5/2004 | Gordon et al. | |
| 6,757,713 B1 | 6/2004 | Ogilvie et al. | |
| 6,757,830 B1 | 6/2004 | Tarbotton et al. | |
| 6,769,016 B2* | 7/2004 | Rothwell et al. | 709/206 |
| 6,772,196 B1* | 8/2004 | Kirsch et al. | 709/206 |
| 6,901,398 B1* | 5/2005 | Horvitz et al. | 709/206 |
| 7,007,067 B1* | 2/2006 | Azvine et al. | 709/206 |
| 7,016,939 B1* | 3/2006 | Rothwell et al. | 709/206 |
| 7,076,527 B2* | 7/2006 | Bellegarda et al. | 709/206 |
| 7,194,464 B2* | 3/2007 | Kester et al. | 709/224 |
| 7,219,148 B2* | 5/2007 | Rounthwaite et al. | 709/206 |
| 7,249,162 B2* | 7/2007 | Rounthwaite et al. | 709/206 |
| 7,380,126 B2* | 5/2008 | Logan et al. | 713/176 |
| 7,389,413 B2* | 6/2008 | Bandini et al. | 713/153 |
| 2002/0038308 A1 | 3/2002 | Cappi | |
| 2002/0087641 A1 | 7/2002 | Levosky | |
| 2002/0087649 A1 | 7/2002 | Horvitz | |
| 2002/0138525 A1 | 9/2002 | Karadimitriou et al. | |
| 2002/0138581 A1 | 9/2002 | MacIntosh et al. | |
| 2002/0147694 A1 | 10/2002 | Dempsey et al. | |
| 2002/0147782 A1 | 10/2002 | Dimitrova et al. | |
| 2002/0199186 A1 | 12/2002 | Ali et al. | |
| 2002/0199194 A1 | 12/2002 | Ali | |
| 2003/0033587 A1 | 2/2003 | Ferguson et al. | |
| 2003/0149726 A1 | 8/2003 | Spear | |
| 2003/0167311 A1 | 9/2003 | Kirsch | |
| 2003/0191969 A1 | 10/2003 | Katsikas | |
| 2003/0200334 A1 | 10/2003 | Grynberg | |
| 2003/0220978 A1 | 11/2003 | Rhodes | |
| 2003/0229672 A1 | 12/2003 | Kohn | |
| 2003/0233415 A1 | 12/2003 | Beyda | |
| 2004/0003283 A1 | 1/2004 | Goodman et al. | |
| 2004/0024823 A1 | 2/2004 | Del Monte | |
| 2004/0054887 A1 | 3/2004 | Paulsen et al. | |
| 2004/0064734 A1 | 4/2004 | Ehrlich | |
| 2004/0068534 A1 | 4/2004 | Augermayr et al. | |
| 2004/0073617 A1 | 4/2004 | Milliken et al. | |
| 2004/0093383 A1 | 5/2004 | Huang et al. | |
| 2004/0093384 A1 | 5/2004 | Shipp | |
| 2004/0111480 A1 | 6/2004 | Yue | |
| 2004/0148358 A1 | 7/2004 | Singh et al. | |
| 2004/0181581 A1* | 9/2004 | Kosco | 709/206 |
| 2004/0205173 A1 | 10/2004 | Hall | |

OTHER PUBLICATIONS

Androutsopoulos, Ion et al. "An Experimental Comparison of Naïve Bayesian and Keyword-Based Anti-Spam Filtering with Personal E-mail Messages." Proceedings of the 23rd Annual International ACM SIGIR Conference on Research and Development in Information Retrieval. Athens, Greece. ACM Press, 2000. pp. 160-67.*

NBEC/NWOCA Anti-Spam Tools, [online] [retrieved Jul. 7, 2004] retrieved from http://home.nwoca.org, Jul. 7, 2004.

Kularski, C. "Compound Procedures for Spam Control," Highland School of Technology, Jan. 2004.

"Technical Responses to Spam," Nov. 2003, Taughannock Networks.

Cranor, Faith, L., LaMacchia, Brian A., "Spam!" Communications of the ACM, vol. 41, No. 8, pp. 74-83, Aug. 1998. U.S.A.

How it Works:Spam Recognition, http://www.death2spam.net/docs/classifier.html, retrieved Aug. 18, 2005, U.S.A.

Cavnar, William B. et al., "N-Gram-Based Text Categorization", Proceedings of SDAIR-94, 3rd Annual Symposium on Document Analysis and Information Retrieval, Las Vegas, NV., USA, Apr. 13, 1994.

"N-Gram-Based Text Categorization", 2 pages, downloaded from http://citeseer.ist.psu.edu/68861.html, Aug. 25, 2005 U.S.A.

TextCat Language Guesser, 2 pages, downloaded from http:/odur.let.rug.nl/~vannoord/Textcat/ on Aug. 25, 2005., U.S.A.

Spam Assassin, The Apache SpamAssasin Project, 2 pages, downloaded from http:/spamassasin.apache.org on Aug. 25, 2005, U.S.A.

Basis Technology's Rosette Language Identifier, 2 pages, downloaded from http:/www.basistech.com/language-identification/ on Aug. 25, 2005, U.S.A.

Karp-Rabin algorithm, 3 pages, downloaded from http:/www-igm.univ-mlv.fr/~lecroq/string/node5.html on Sep. 1, 2005, U.S.A.

Rabin-Karp string search algorithm, 5 pages, downloaded from http://en.wikipedia.org/wiki/Rabin-Karp_string_search_alogrithm on Aug. 31, 2005 U.S.A.

The Rabin-Karp algorithm, String searching via Hashing, 5 pages, downloaded from http://www.eecs.harvard.edu/~ellard/Q-97/HTML/root/node43 on Aug. 31, 2005 U.S.A.

spambully.com web pages [online]. Spam Bully [retreieved Jan. 16, 2003]. Retrieved from the Internet: <URL: http://outlook.spambully.com/about.php>.

cauce web pages [online]. Coalition Against Unsolicited Commercial Email [retreieved Mar. 17, 2003]. Retrieved from the Internet: <URL: http://www.cauce.org/about/problem.shtml>.

wikipedia.org web pages [online]. Wikipedia [retreieved Jan. 17, 2003]. Retrieved from the Internet: <http://www.wikipedia.org/w/wiki.phtml?title=Machine_learning&printable=yes.

* cited by examiner

SUPPRESSING SPAM USING A MACHINE LEARNING BASED SPAM FILTER

TECHNICAL FIELD

This invention pertains to the field of reducing the amount of spam to which a computing device is subjected, by using a machine learning based spam filter.

BACKGROUND ART

Machine learning based spam filters require training data in order to be successful. A common problem with this class of filters is that it is difficult to gather training data that is representative of the environment of the user of the computing device, especially without manual user feedback.

Current machine learning based spam filters are trained by a third party, by the user, or by both a third party and the user. The third party may be a software publisher. For example, the spam filter may be Norton Spam Alert, which is trained by its software publisher, SYMANTEC® Corporation of Cupertino, Calif. Machine learning based spam filters trained by third parties tend to have a lot of false positives, because the training corpus for the filter normally does not contain many clean electronic messages that are actually experienced by an individual user or enterprise. However, because such a third party corpus contains a good representation of the overall spam experienced by the users and enterprises, the false negative rate is usually low. On the other hand, spam filters trained exclusively by an individual user or enterprise typically result in a low false positive rate (because of the relatively large volume of clean messages available to the user or enterprise precisely representing what is typical for that user or enterprise) but a medium false negative rate, because the user or enterprise uses a relatively small sample of spam training messages compared with a third party.

Filters are available that are initially trained by a third party and then retrained manually over time by the user or enterprise. While this technique is feasible for an individual user, it presents problems for enterprises, because the enterprise must process a very large volume of messages (all the messages of all the individual computing devices within the enterprise).

The present invention improves the training of machine learning based spam filters, so that such filters can enjoy a low false positive rate and a low false negative rate, and can be used effectively by both individual users and enterprises.

DISCLOSURE OF INVENTION

The invention described herein comprises computer implemented methods, apparati, and computer readable media for suppressing spam entering a computing device (1). A method embodiment of the present invention comprises the steps of routing (21) an electronic message leaving the computing device (1) to a machine learning based spam filter (4); defining (22) the message (2) to be clean; and training (23) the filter (4), with the message (2) being an input to the filter (4).

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

As used throughout this specification including claims, "spam" is any electronic message that is unwanted by the recipient; and a "clean" electronic message is one that is not spam.

Figure 1:
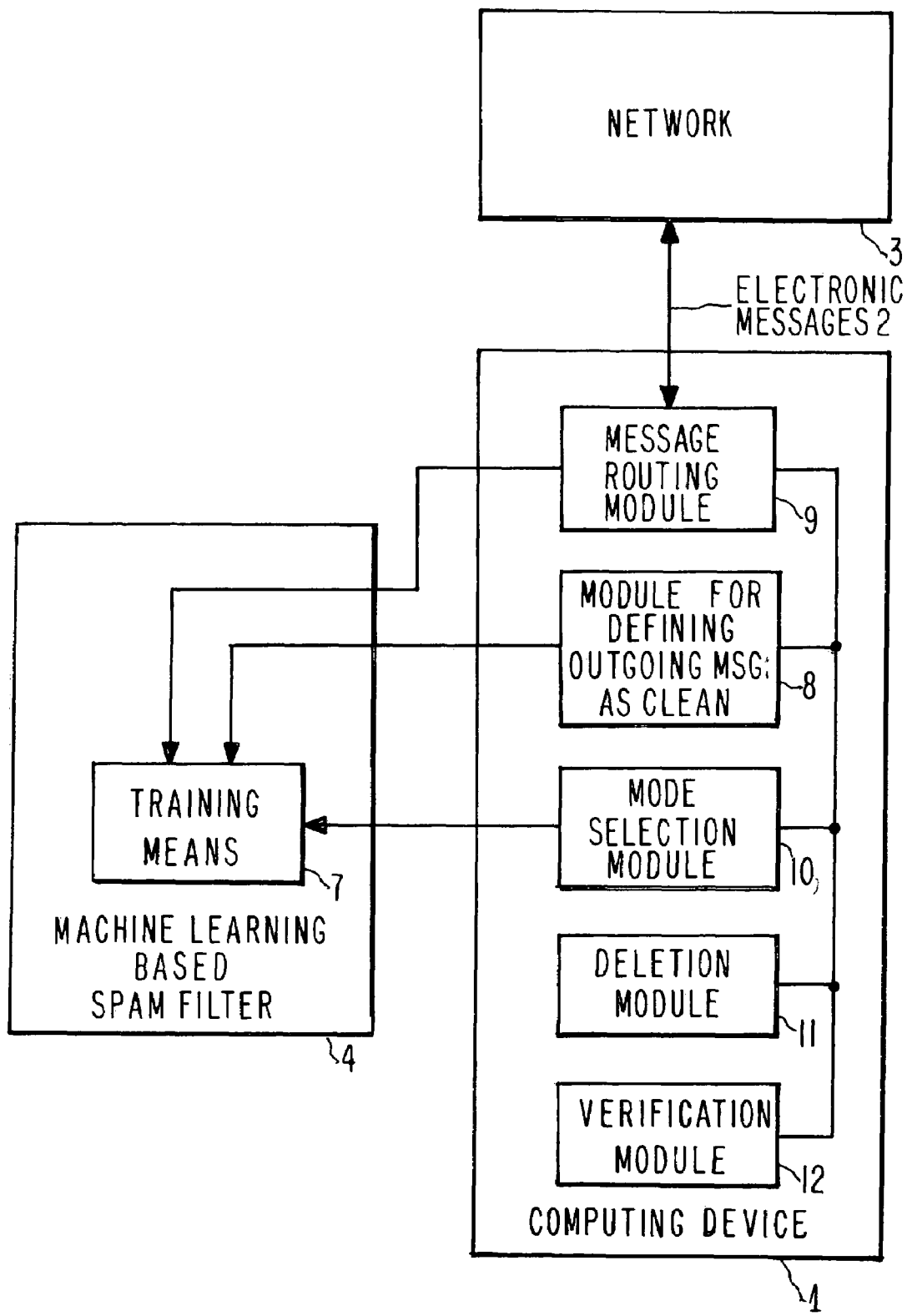
FIG. 1 is a block diagram illustrating components utilized in the present invention.

With reference to FIG. 1, the recipient is computing device 1. Device 1 is broadly defined herein as any type of computer or any type of device containing a computer. Thus, device 1 may be an individual user's computer such as a personal computer (PC), laptop computer, handheld computer, etc.; an enterprise computer such as a workstation, a gateway computer, or a proxy computer; a two-way pager; or a messaging telephone.

Computing device 1 sends and receives electronic messages 2 to and from a network 3. The network 3 may be any type of wired or wireless network, such as the Internet, the public switched telephone network (PSTN), a local area network (LAN), or a wide area network (WAN). Electronic message 2 is any message that is in electronic or digital form. Thus, for example, electronic message 2 can be e-mail, an instant message, a chat room message, a newsgroup message such as an Internet newsgroup message, a wireless message such as Morse code modulated onto an electromagnetic carrier, an SMS (Simple Messaging Service) message, an MMS (Multimedia Messaging Service) message, an EMS (Enhanced Messaging Service) message, or a two-way text or graphics pager message.

Associated with computing device 1 is a message routing module 9 that sends incoming and outgoing messages 2 to machine learning based spam filter 4. "Incoming" means entering computing device 1 from network 3, and "outgoing" means leaving computing device 1 to network 3. The module 9 may be a stand-alone software program, a plug-in module, a proxy module, or a gateway module. In the case where message 2 is e-mail, the module 9 may be a plug-in module associated with e-mail client software resident on computing device 1. An example of a suitable proxy module 9 is Email Scanner included in Norton Internet Security published by SYMANTEC® Corporation of Cupertino, Calif. All modules referred to in this patent application can be implemented in hardware, firmware, or software, or any combination thereof. When implemented in software, said modules can reside on any computer readable medium, such as a hard disk, floppy disk, CD, DVD, etc.

A machine learning based filter such as filter 4 illustrated in FIG. 1 is a filter that is refined during a training mode, and that operates on live messages 2 during a recall mode. Each type of filter 4 of the present invention has an input where messages 2 are presented and a binary output: the message 2 is deemed by filter 4 to contain spam or deemed to be clean. When filter 4 is not the sole decision maker, the binary outputs are "clean" and "suspected spam". Throughout this specification including claims, when an output is referred to as "suspected spam", it is meant to cover the output "spam" when filter 4 is the sole decision maker.

Each type of filter 4 has a training means 7 associated therewith. The training means 7 may be a module that, inter alia, instructs filter 4 to reach a certain binary output whenever a certain message 2 is presented at the input of the filter 4.

Examples of machine learning based filters suitable for use as filters 4 in the present invention include a neural network, a Bayesian classifier, and a support vector machine. During the recall mode, a neural network type of spam filter 4 assigns a number between 0 and 1 to the incoming message 2. If the assigned number is greater than a certain preselected threshold, such as 0.75, the message 2 is deemed by filter 4 to be suspected spam; otherwise, the message 2 is deemed to be clean. A Bayesian classifier type of spam filter 4 assigns, for each word within the incoming message 2, a probability that the word is suspected spam and a probability that the word is clean. Then, the Bayesian classifier calculates a composite value for all the words in the message 2. This composite is checked against preselected values to yield the decision of the Bayesian classifier. A support vector machine uses a nonlinear kernel function to transform distances between sample points before making comparisons.

Figure 2:
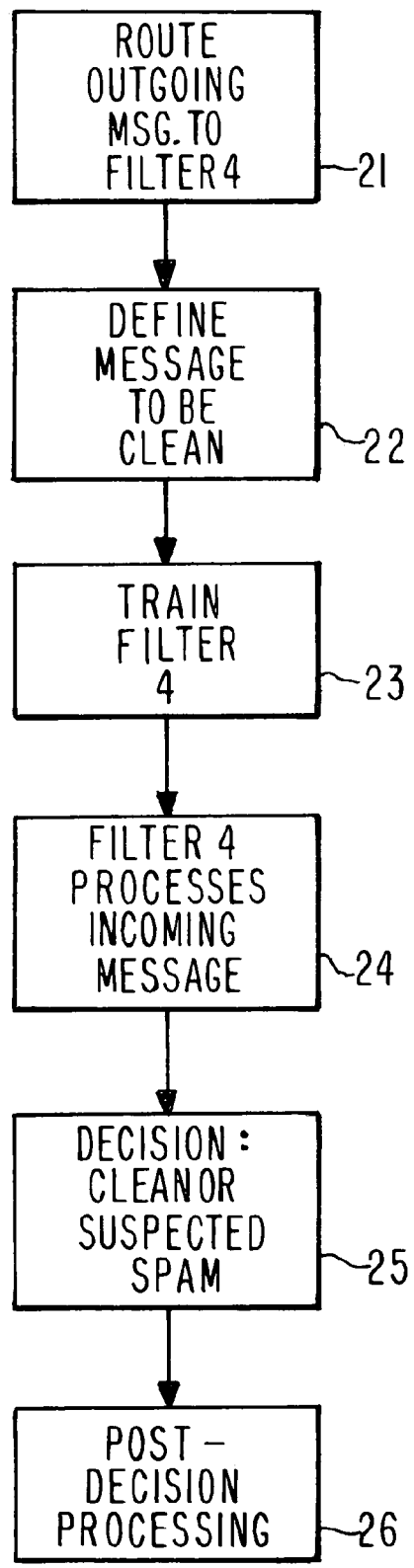
FIG. 2 is a flow diagram illustrating a method embodiment of the present invention.

FIG. 2 illustrates a method embodiment of the present invention. In step 21, an outgoing message 2 leaving computing device 1 is routed by module 9 to the input of machine learning based spam filter 4. When the outgoing message 2 is a reply to an original message, only the reply should be routed to filter 4. Similarly, when the outgoing message 2 is a forwarded message, only the forwarding comments, and not the original message, should be routed to filter 4. This assures that filter 4 is trained only on content added by computing device 1.

At step 22, a module 8 associated with computing device 1 defines the outgoing message 2 of step 21 to be clean. Step 22 is based on the theory that most messages 2 sent by the user of computing device 1 are messages 2 that are worded similarly to, and have the same subject matter as, messages 2 that the user wants to receive. And, as stated above, a wanted message 2 is, by definition, clean, not spam. This theory is problematic when the user of computing device 1 is a spammer, but the present invention is designed to protect the victims of spammers, not spammers themselves.

At step 23, filter 4 is made (e.g., by mode selection module 10 associated with device 1 issuing a command to training means 7) to enter training mode, with the message 2 from steps 21 and 22 taken into account during said training. Steps 22 and 23 may be combined. With respect to step 23, filter 4 may or may not have been previously trained, either by a third party, by the user of device 1, or by a combination of a third party and the user of device 1. As used herein, "third party" means an entity other than the user of device 1, and other than an entity that sends or receives messages 2 to device 1.

At step 24, filter 4 is instructed to process a new incoming message 2 in recall mode. This instruction to filter 4 may be made by module 10 upon the occurrence of an incoming message 2 arriving at device 1.

At step 25, filter 4 makes its decision: either message 2 is clean, or it contains suspected spam. This decision is based upon the input that was presented to filter 4 in step 22, as well as upon any previous training that filter 4 has received.

At step 26, post-decision processing is performed, based upon the decision made in step 25. For example, at step 26 deletion module 11 associated with device 1 can delete a message 2 that has been deemed to contain suspected spam, or verification module 12 associated with device 1 can subject the message 2 to a verification process, e.g., processing by one or more spam filters other than filter 4.

Figure 3:
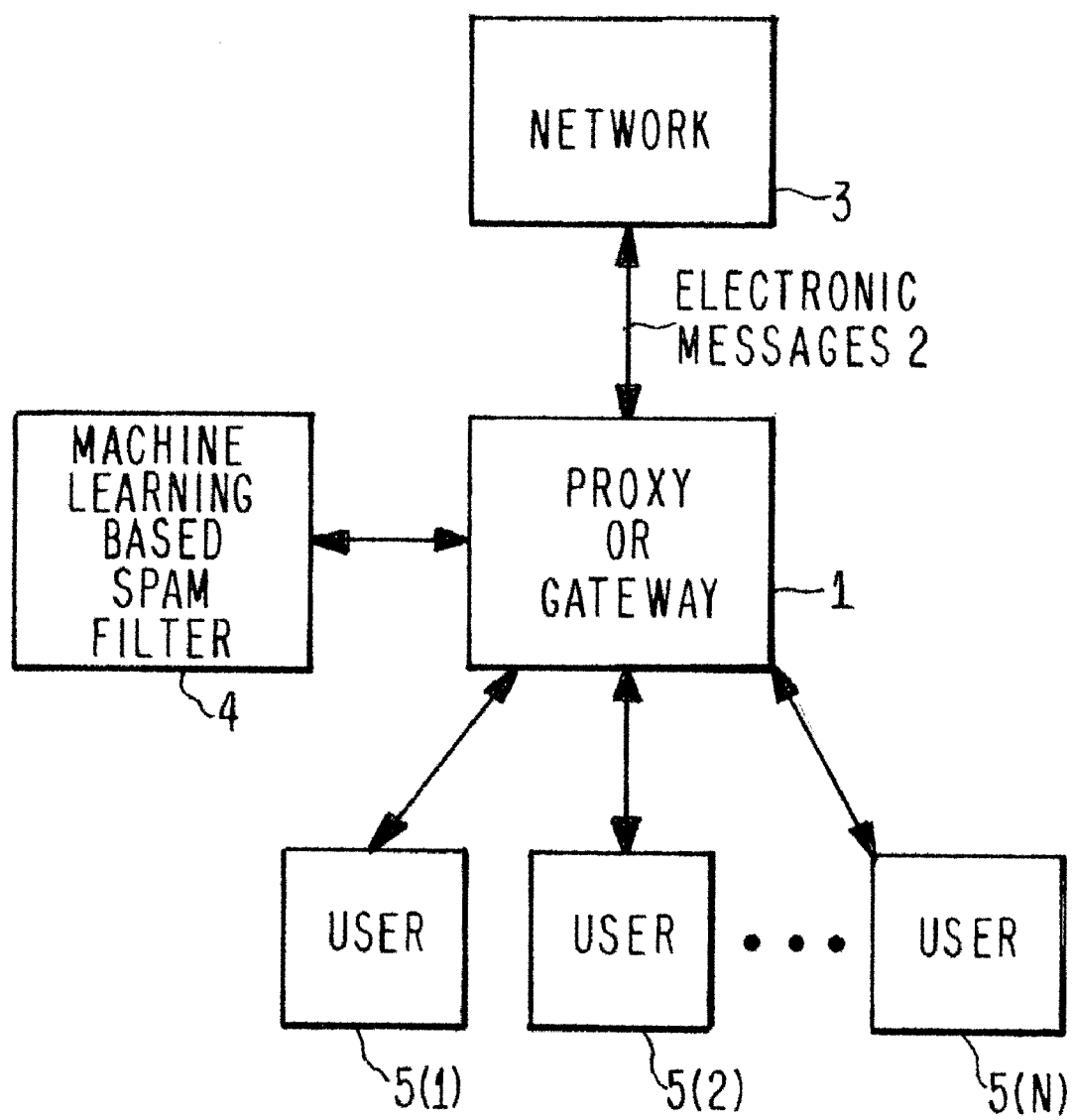
FIG. 3 is a block diagram illustrating one embodiment of the present invention.

FIG. 3 illustrates an embodiment of the present invention in which there are a plurality N of computer users 5 organized into some sort of enterprise, e.g., a corporation, a university, a set of affiliated users 5 connected to each other by a local area network, etc. N can be any positive integer. In this embodiment, computing device 1 may be a proxy or gateway computer having, inter alia, the responsibility to screen messages 2 entering and leaving the enterprise.

Figure 4:
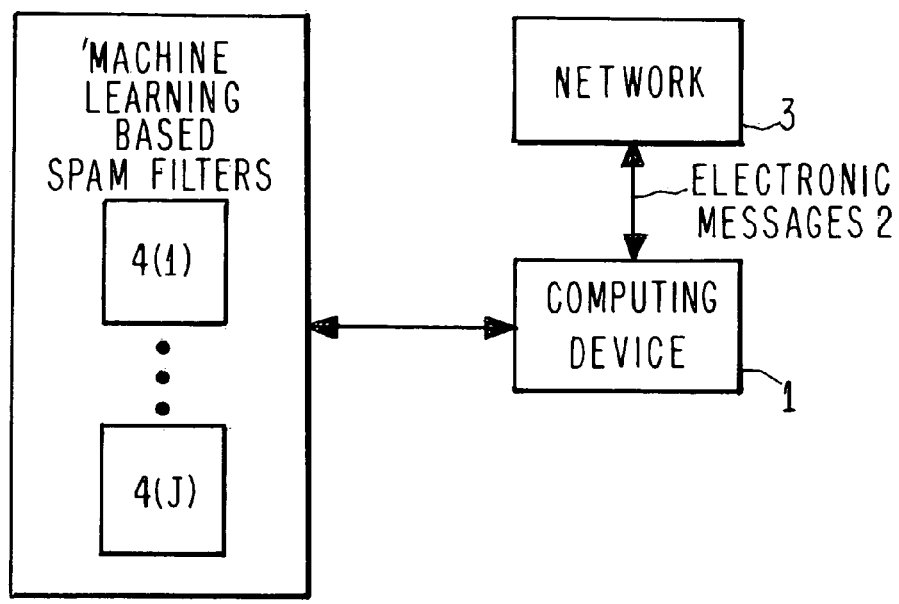
FIG. 4 is a block diagram illustrating a second embodiment of the present invention.

FIG. 4 further illustrates that there may be a plurality J of machine learning based spam filters 4 coupled to computing device 1. J can be any positive integer. As used through this specification including claims, "coupled" encompasses any type of coupling or connection, whether direct or indirect. Normally, the filters 4 are different types of machine learning based spam filters 4, but two or more of these filters 4 could be the same type.

Figure 5:
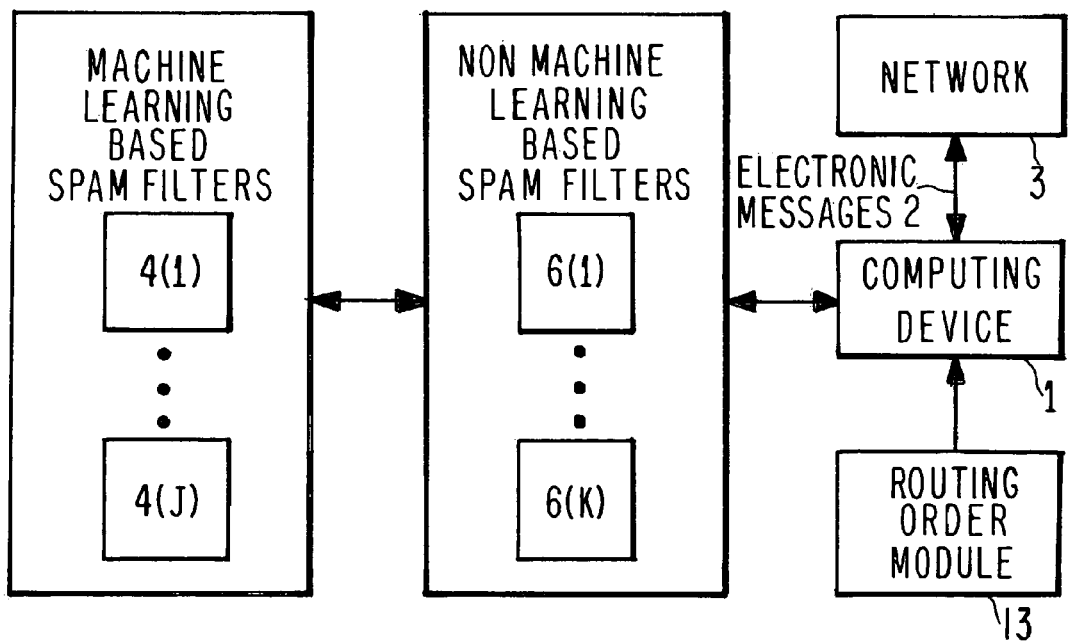
FIG. 5 is a block diagram illustrating a third embodiment of the present invention.

FIG. 5 illustrates that there can be a plurality K of non machine learning based spam filters 6 coupled to device 1. K can be any positive integer. Such a filter 6 may be a fuzzy hash filter, a collaborative filter, an RBL filter, a white list/black list filter, etc. Filter 6 is any type of filter that is not refined during a training mode. While a filter 6 is not dynamic as in the case of a filter 4, a filter 6 may be faster than a filter 4 and therefore may have some utility, whether used alone or in combination with a filter 4. The enterprise may use a plurality J filters 4 and/or a plurality K filters 6 in order to improve the false positive and/or false negative rate, at some expense in the speed of processing. When J filters 4 are used, at least one, and possibly all, of them is trained in step 23.

In the embodiment illustrated in FIG. 5, messages 2 are first routed to filter(s) 6 and then to filter(s) 4, because non machine learning based spam filters 6 are usually faster than machine learning based spam filters 4. Thus, filters 4 may be used to verify preliminary decisions (suspected spam versus clean) made by filter(s) 6. The routing order may be contained in a routing order module 13 associated with device 1.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. A computer implemented method for training a filter to suppress spam entering a computing device of an individual user, said method comprising the steps of:
   routing an electronic message written by the individual user and outgoing from the computing device to a machine learning based spam filter, the spam filter used to filter messages entering the computing device;
   defining the outgoing message to be clean;
   training the filter using the outgoing message wherein the outgoing message is a forwarded message and the filter is trained based on content within the outgoing message written by the individual user;
   instructing the filter to process an electronic message incoming to the computing device of the individual user; and
   deciding by the filter whether the incoming message is clean or contains suspected spam based on the training of the filter with the outgoing message.

2. The method of claim 1 wherein the electronic message is a message from the group of messages consisting of: e-mail, an instant message, a chat room message, a newsgroup message, a wireless message, an SMS message, an MMS message, an EMS message, and a two-way pager message.

3. The method of claim 1 wherein the computing device is a device from the group of devices consisting of: an individual user computer, an enterprise computer, a two-way pager, and a messaging telephone.

4. The method of claim 3 wherein the computing device is an enterprise computer, and the enterprise computer is a computer from the group of computers consisting of a gateway and a proxy.

5. The method of claim 1 wherein:
the electronic message comprises e-mail;
the computing device comprises an e-mail client; and
the routing step is performed by a plug-in module associated with the e-mail client.

6. The method of claim 1 wherein:
a plurality of machine learning based spam filters are coupled to the computing device; and
more than one filter is trained in the training step.

7. The method of claim 1 wherein at least one non machine learning based spam filter is coupled to the computing device.

8. The method of claim 7 wherein an incoming message is first routed to at least one non machine learning based spam filter, and then is routed to the machine learning based spam filter.

9. The method of claim 1 wherein the machine learning based spam filter is a filter from the group of filters consisting of: a neural network, a Bayesian classifier, and a support vector machine.

10. The method of claim 1 wherein instructing the filter to process the electronic message incoming to the computer takes place in a recall mode.

11. The method of claim 1 wherein, when the filter decides that the incoming electronic message contains suspected spam, the incoming message is subjected to a step from the group of steps consisting of:
deleting the incoming message; and
subjecting the incoming message to a verification process.

12. The method of claim 1 wherein the filter has been previously trained by a third party.

13. A computer-readable medium containing computer program instructions for training a filter to suppress spam entering a computing device of an individual user, said computer program instructions for performing the steps of:
routing an electronic message written by the individual user and outgoing from the computing device to a machine learning based spam filter, the spam filter used to filter messages entering the computing device;
defining the outgoing message to be clean;
training the filter using the outgoing message wherein the outgoing message is a forwarded message and the filter is trained based on content within the outgoing message written by the individual user;
instructing the filter to process an electronic message incoming to the computing device of the individual user; and
deciding by the filter whether the incoming message is clean or contains suspected spam based on the training of the filter with the outgoing message.

14. The computer-readable medium of claim 13 wherein the electronic message is a message from the group of messages consisting of: e-mail, an instant message, a chat room message, a newsgroup message, a wireless message, an SMS message, an MMS message, an EMS message, and a two-way pager message.

15. The computer-readable medium of claim 13 wherein the computing device is a device from the group of devices consisting of: an individual user computer, an enterprise computer, a two-way pager, and a messaging telephone.

16. The computer-readable medium of claim 15 wherein the computing device is an enterprise computer, and the enterprise computer is a computer from the group of computers consisting of a gateway and a proxy.

17. The computer-readable medium of claim 13 wherein:
the electronic message comprises e-mail;
the computing device comprises an e-mail client; and
the routing step is performed by a plug-in module associated with the e-mail client.

18. The computer-readable medium of claim 13 wherein:
a plurality of machine learning based spam filters are coupled to the computing device; and
more than one filter is trained in the training step.

19. The computer-readable medium of claim 13 wherein at least one non machine learning based spam filter is coupled to the computing device.

20. The computer-readable medium of claim 19 wherein an incoming message is first routed to at least one non machine learning based spam filter, and then is routed to the machine learning based spam filter.

21. The computer-readable medium of claim 13 wherein the machine learning based spam filter is a filter from the group of filters consisting of a neural network, a Bayesian classifier, and a support vector machine.

22. The computer-readable medium of claim 13 wherein the computer program instructions specify instructing the filter to process the electronic message incoming to the computer in a recall mode.

23. The computer-readable medium of claim 13 wherein, when the filter decides that the incoming electronic message contains suspected spam, the incoming message is subjected to a step from the group of steps consisting of:
deleting the incoming message; and
subjecting the incoming message to a verification process.

24. The computer-readable medium of claim 13 wherein the filter has been previously trained by a third party.

25. An apparatus for training a filter to suppress spam entering a computing device of an individual user, said apparatus comprising:
coupled to the computing device, a machine learning based spam filter, the spam filter used to filter messages entering the computing device;
coupled to the computing device and to the machine learning based spam filter, means for defining an electronic message written by the individual user and outgoing from the computing device to be clean;
coupled to the machine learning based spam filter and to the defining means, means for training the filter using the outgoing message wherein the outgoing message is a forwarded message and the filter is trained based on content within the outgoing message written by the individual user, instructing the filter to process an electronic message incoming to the computing device of the individual user, and
deciding by the filter whether the incoming message is clean or contains suspected spam based on the training of the filter with the outgoing message.

26. The apparatus of claim 25 wherein the electronic message is a message from the group of messages consisting of: e-mail, an instant message, a chat room message, a newsgroup message, a wireless message, an SMS message, an MMS message, an EMS message, and a two-way pager message.

27. The apparatus of claim 25 wherein the computing device is a device from the group of devices consisting of: an individual user computer, an enterprise computer, a two-way pager, and a messaging telephone.

28. The apparatus of claim 27 wherein the computing device is an enterprise computer, and the enterprise computer is a computer from the group of computers consisting of: a gateway and a proxy.

29. The apparatus of claim 25 wherein:

the electronic message comprises e-mail;

the computing device comprises an e-mail client; and the e-mail client comprises a plug-in module adapted to present the electronic message to an input of the filter.

30. The apparatus of claim 25 wherein:

a plurality of machine learning based spam filters are coupled to the computing device;

more than one of the filters has training means associated therewith; and each of said training means is coupled to the defining means.

31. The apparatus of claim 25 wherein at least one non machine learning based spam filter is coupled to the computing device.

32. The apparatus of claim 31 further comprising means for first routing an incoming message to at least one non machine learning based spam filter, and then routing the incoming message to the machine learning based spam filter.

33. The apparatus of claim 25 wherein the machine learning based spam filter is a filter from the group of filters consisting of a neural network, a Bayesian classifier, and a support vector machine.

34. The apparatus of claim 25 further comprising:

means for deleting the incoming electronic message; and means for subjecting the incoming electronic message to a verification process.

35. The apparatus of claim 25 wherein the filter has been previously trained by a third party.

* * * * *